United States Patent [19]

Iwasaka et al.

[11] Patent Number: 5,755,552
[45] Date of Patent: May 26, 1998

[54] OBJECT SELECTING SYSTEM

[75] Inventors: Ichiro Iwasaka, Kako-gun; Kenichi Yamashita, Kobe, both of Japan

[73] Assignee: Okura Yusoki Kabushiki Kaisha, Hyogo, Japan

[21] Appl. No.: 699,964

[22] Filed: Aug. 20, 1996

[51] Int. Cl.$^6$ .................................................. B65G 01/02
[52] U.S. Cl. ...................... 414/797.9; 198/418; 221/267
[58] Field of Search .......................... 414/797.5, 797.6, 414/797.9, 795.7, 795.8; 198/418; 221/267

[56] References Cited

U.S. PATENT DOCUMENTS

| | | | |
|---|---|---|---|
| 4,442,932 | 4/1984 | Sashiki et al. | 198/358 |
| 4,484,289 | 11/1984 | Hemond | 198/358 |
| 5,454,688 | 10/1995 | Pippin | 221/267 |
| 5,476,191 | 12/1995 | Dunford et al. | 414/797.6 |

FOREIGN PATENT DOCUMENTS 15064  2/1977  Japan .................... 198/418.2

*Primary Examiner*—Karen B. Merritt
*Assistant Examiner*—Gregory A. Morse
*Attorney, Agent, or Firm*—Morrison Law Firm

[57] ABSTRACT

An assortment of objects is dispensed from a plurality of object holders onto a conveyor for loading into a container at an end of the conveyor. The objects are dispensed onto discrete sections of the conveyor with like objects occupying like sections. Since like objects are grouped together on the conveyor, damage due to any impact between objects is reduced because, when objects impact objects of the same class, less damage occurs than when disparate objects impact each other. Discrete sections with heavier objects are located upstream of discrete sections with lighter objects. When the lighter and heavier objects are discharged from the conveyor into the container, the lighter objects are loaded on top of the heavier objects, thereby reducing any damage which occurs through impact. Gaps on the conveyor between different groups of objects reduces the likelihood of impacts on the conveyor.

30 Claims, 9 Drawing Sheets

OBJECT SELECTING SYSTEM

BACKGROUND OF THE INVENTION

The present invention relates to an object selecting system for automatically selecting a specific assortment of objects and loading the assortment of objects into a container. The object selecting system loads different types of objects onto different locations of a conveyor for transporting the different types of objects to the container.

In a conventional selecting system, a plurality of object storage/discharge units are arranged along one or both sides of a conveyor. Each of the object storage/discharge units has an object storage section. Each of the object storage sections holds a plurality of objects. Each of the object storage/discharge units also has a discharge mechanism for discharging the objects contained in the storage sections onto the belt of the conveyor. Objects that have been discharged onto the conveyor are collected in, for example, a container disposed at the end of the conveying path of the conveyor.

When different types of objects are to be loaded into the same container at each selecting cycle, the different types of objects are discharged from their respective object storage/discharge units. Each object is discharged onto the conveyor when a predetermined discharge point of the conveyor passes the object storage/discharge unit that that object is stored in. The different types of objects which constitute the assortment for each selecting cycle are accumulated in the same location on the conveyor. The objects are then loaded from the end of the conveying path of the conveyor into the container.

In the above configuration of conventional selecting systems, the different types of objects that make up the assortment are discharged onto one place on the conveyor to facilitate loading the container. This results in impact between objects, sometimes causing damage to objects in the lower positions, especially when heavy or hard objects are discharged onto light or fragile objects which are already on the conveyor.

When objects are discharged from the end of the conveying path of the conveyor into the container, the objects again impact each other. When heavy or hard objects on the upstream side of the conveying path of the conveyor are dumped onto light or fragile objects already loaded into the box, the impacts cause damage to the lighter objects.

Furthermore, when an object has a cylindrical shape, or other shapes which easily roll or tumble, it is possible for that object to roll out of the pile of objects in the assortment and fail to be collected in the container.

OBJECTS AND SUMMARY OF THE INVENTION

It is an object of the present invention to provide a selecting system that overcomes the drawbacks of the prior art.

It is another object of the present invention to provide a selecting system capable of limiting damage to objects when they are discharged onto the belt of a conveyor.

It is another object of the present invention to provide a selecting system capable of limiting damage to objects as they are discharged from the conveyor into a container.

It is yet another object of the present invention to provide a selecting system capable of preventing unsteady objects from rolling out of position.

Briefly stated, an assortment of objects is dispensed from a plurality of object holders onto a conveyor for loading into a container at an end of the conveyor. The objects are dispensed onto discrete sections of the conveyor with like objects occupying like sections. Since like objects are grouped together on the conveyor, damage due to any impact between objects is reduced because, when objects impact objects of the same class, less damage occurs than when disparate objects impact each other. Discrete sections with heavier objects are located upstream of discrete sections with lighter objects. When the lighter and heavier objects are discharged from the conveyor into the container, the lighter objects are loaded on top of the heavier objects, thereby reducing any damage which occurs through impact. Gaps on the conveyor between different groups of objects reduces the likelihood of impacts on the conveyor.

According to an embodiment of the present invention, an apparatus for selecting and loading an assortment of objects into a container, includes, a conveyor, at least first and second object holders, the first object holder for holding a plurality of a first type of objects, the second object holder for holding a plurality of a second type of objects, the first object holder including means for dispensing the first type of objects onto a first discrete section of the conveyor, the second object holder including means for dispensing the second type of objects onto a second discrete section of the conveyor and the conveyor for conveying the first and second types of objects to an end thereof for loading into the container.

According to another embodiment of the present invention, an apparatus for selecting and loading at least one assortment, the assortment including at least one type of object, into a container, includes, an object conveyor for transporting the at least one assortment, a plurality of object holders mounted along at least one side of the object conveyor, a controller including means for defining discrete assortment zones on the object conveyor for each of the at least one assortment, the controller further including means for dividing the assortment zone into discrete and separate class zones responsive to each different type of object in the at least one assortment and each of the object holders including means for dispensing one of the at least one type of object onto the object conveyor in one of the discrete class zones.

According to another embodiment of the present invention, an apparatus for selecting assortments of at least one type of object and loading each of the assortments into a container, includes, an object conveyor for transporting the objects, means for determining a position of the conveyor, a plurality of object holders mounted along at least one side of the object conveyor, each of the object holders including means for, dispensing a single one of the at least one type of object onto one of a plurality of discrete sections of the object conveyor and the means for dispensing being responsive to both a type of the at least one type of object being dispensed and the means for determining a position of the conveyor.

According to still another embodiment of the present invention, an apparatus for selecting and loading at least one assortment, the assortment including at least first and second types of objects, into a container, includes, an object conveyor for transporting the at least one assortment, a plurality of object holders mounted along at least one side of the object conveyor, a controller including means for defining discrete assortment zones on the object conveyor for each of the at least one assortment, the controller further including means for dividing each of the discrete assortment zones into a plurality of discrete class zones responsive to each different type of the at least first and second types of objects in the at least one assortment and each of the object holders including means for dispensing a single one of the at least first and second types of objects onto the object conveyor in one of the discrete type zones corresponding to the type of the at least first and second types of objects being dispensed.

A selecting system according to the present invention includes a conveyor for conveying objects which are placed on the belt thereof. Object storage/discharge units are arranged along one side or both sides of the conveyor. Each object storage/discharge unit has a storage section for housing objects. Each object storage/discharge unit also has a discharge means for discharging the bottommost object housed in the storage section onto the belt of the conveyor. Each storage section respectively houses a different class of objects. A registration means registers the class to which each object belongs. A control means initiates the discharge of the objects from the object storage/discharge units. The control means assigns classified zones on the belt of the conveyor in such a manner that the zones are arranged along the conveying path of the conveyor and correspond to respective classes registered in the aforementioned registration means. The control means also coordinates the discharge of objects into corresponding class zones.

Another feature of the selecting system of the present invention includes the registration means registering classes according to the weight of the objects. The control means sets zones classified by weight on the belt of the conveyor. The class zones are arranged from the class zone for the heaviest objects at a downstream side to the class zone for the lightest objects at an upstream side along the conveying path.

A further feature of the selecting system includes the registration means registering a class for unsteady objects which tumble easily and at least two other classes. The control means sets zones on the belt of the conveyor in such a way that the zones are arranged along the conveying path of the conveyor so that the class for unsteady objects is sandwiched between zones for other classes.

According to an embodiment of the present invention, the conveying path of the conveyor is zoned in accordance with the classification of objects. Objects are discharged into corresponding classified zones from the object storage/ discharge units.

A selecting system of the present invention includes a conveying path of a conveyor divided into the downstream side of the conveying path, which is zoned for the heaviest objects, and into the upstream side of the conveying path, which is zoned for the lightest objects. Objects are dumped from the conveyor in the order from those in the zone of the heaviest class to those in the lightest-class zone. The lighter objects are loaded on top of the heavier objects, thereby reducing the damage which occurs by impact of the objects in the container.

In addition, a selecting system of the present invention further includes a separate zone for unsteady objects. Zones for steady objects categorized in other classes are also arranged in the conveying path of the conveyor. The zones for classes of steady objects are arranged upstream and downstream from the zone for unsteady objects, so that even if the unsteady objects tumble, objects positioned upstream and downstream from the unsteady objects prevent the unsteady objects from rolling out of their zone.

Class zones for respective classes of objects are arranged on the conveyor along the conveying path of the conveyor. Objects corresponding to respective class zones are discharged from the object storage/discharge units onto the belt within their respective class zone. Therefore, even if there is impact between objects when an object is discharged onto other objects, damage from the impact is limited, because the objects belong to the same class.

The above, and other objects, features and advantages of the present invention will become apparent from the following description read in conjunction with the accompanying drawings in which like reference numerals designate the same element.

DETAILED DESCRIPTION OF PREFERRED EMBODIMENTS

Figure 1:
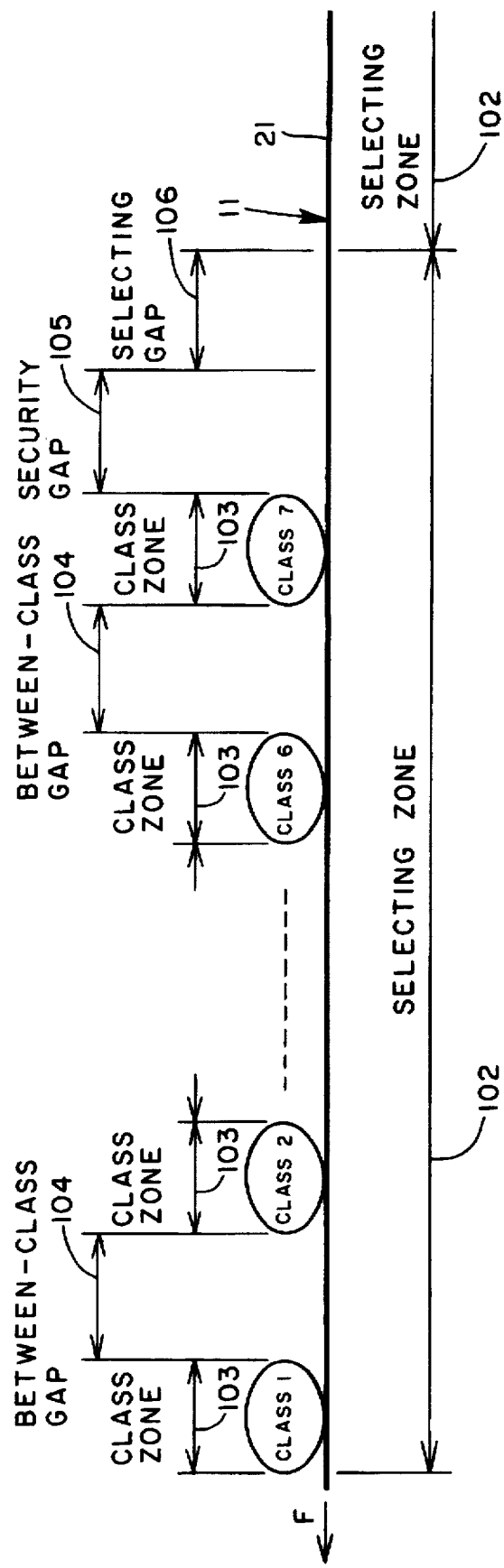
FIG. 1 is an explanatory drawing showing the basic arrangement of classified objects conducted by an object selecting system according to an embodiment of the present invention.

Referring to FIG. 1, a belt 21 of a conveyor 11 moves in a conveying direction F. A length of conveyor 11 is divided into a plurality of selecting zones 102. Each selecting zone 102 is further divided into a plurality of class zones 103 respectively assigned to classes 1 to 7. Classes 1 to 7 are arranged along conveying direction F. Each selecting zone 102 includes a plurality of class zones 103; one for each of classes 1 to 7. Each of classes 1 to 7 corresponds to a different type of object in an assortment of objects to be loaded onto belt 21. A between-class gap 104 separates every two adjacent class zones 103. A security gap 105 and a selecting gap 106 separate adjacent selecting zones 102. Security gap 105 and selecting gap 106 are arranged behind the class zone 103 which is furthest upstream (class 7 in this case). Thus, selecting zone 102 extends from a first of class zones 103, i.e. the class zone furthest downstream, to selecting gap 106. A plurality of selecting zones 102 are continuously provided on belt 21 of conveyor 11.

Figure 2:
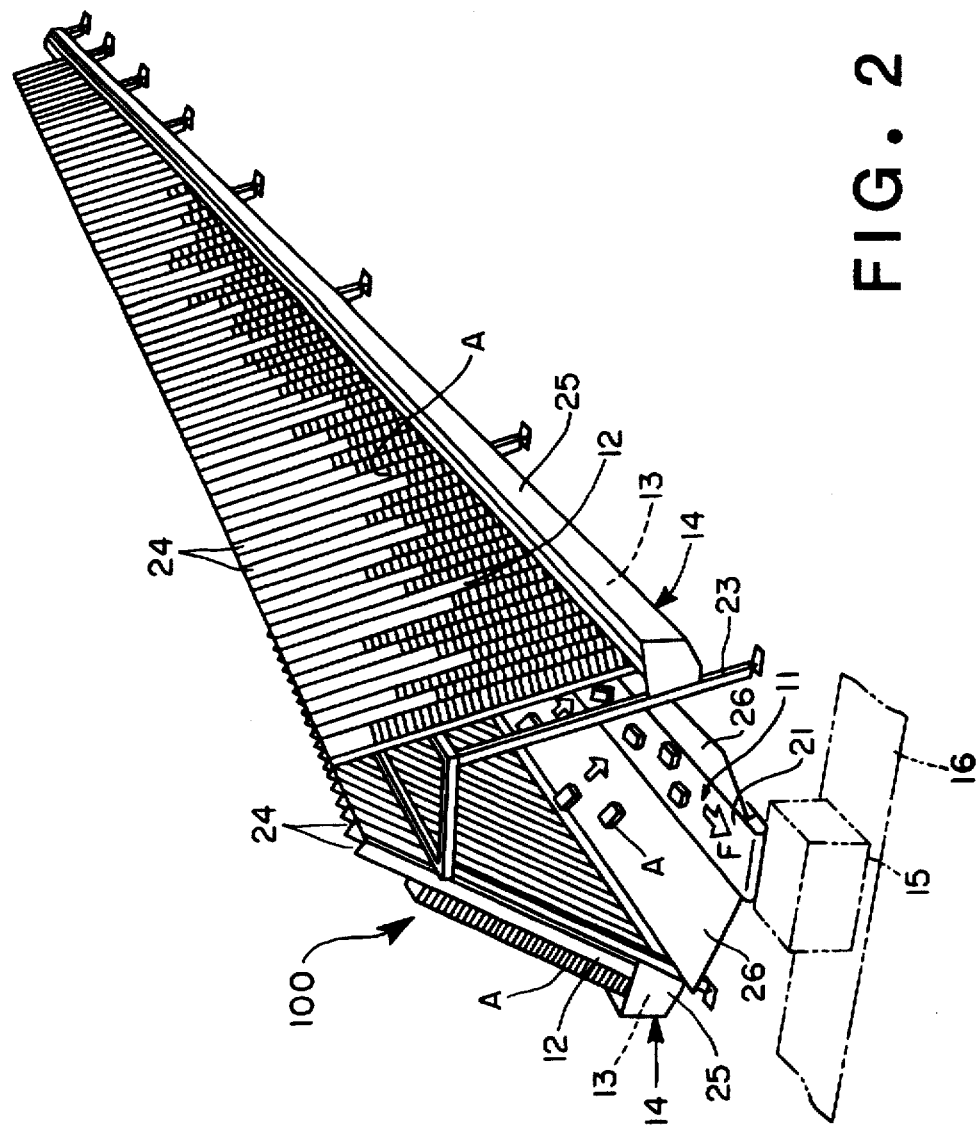
FIG. 2 is a perspective view of the object selecting system of the present invention.

Referring to FIG. 2, conveyor 11 is disposed at the center of an object selecting system 100. A plurality of object storage/discharge units 14 are arranged along both sides of conveyor 11. Each object storage/discharge unit 14 has a storage section 12 for holding a plurality of objects A. Objects A are sorted into different classes and assigned to respective storage sections 12 according to their classification. Each object storage/discharge unit 14 also includes a discharge mechanism 13 for discharging objects A contained in storage section 12 onto conveyor 11. A container conveyor 16 transports containers 15 to an object loading position at a forward end of conveyor 11, "forward" being with respect to object conveying direction F. Each container 15 receives the assortment of objects A discharged by each cycle of the discharge process. Container conveyor 16 extends perpendicularly to conveyor 11.

Object storage/discharge units 14 are mounted on an essentially A-shaped frame body 23. Frame body 23 straddles over conveyor 11. Frame 23 also supports a plurality of storage frames 24. Storage sections 12 are housed within storage frames 24. The storage frames 24 are inclined along both sides of frame body 23. Discharge mechanisms 13 of object storage/discharge units 14 are covered by a plurality of covers 25. A chute 26 is mounted between each row of discharge mechanisms 13 and conveyor 11. Chute 26 directs objects A that have been discharged by discharge mechanism 13 onto belt 21 of conveyor 11.

Figure 3:
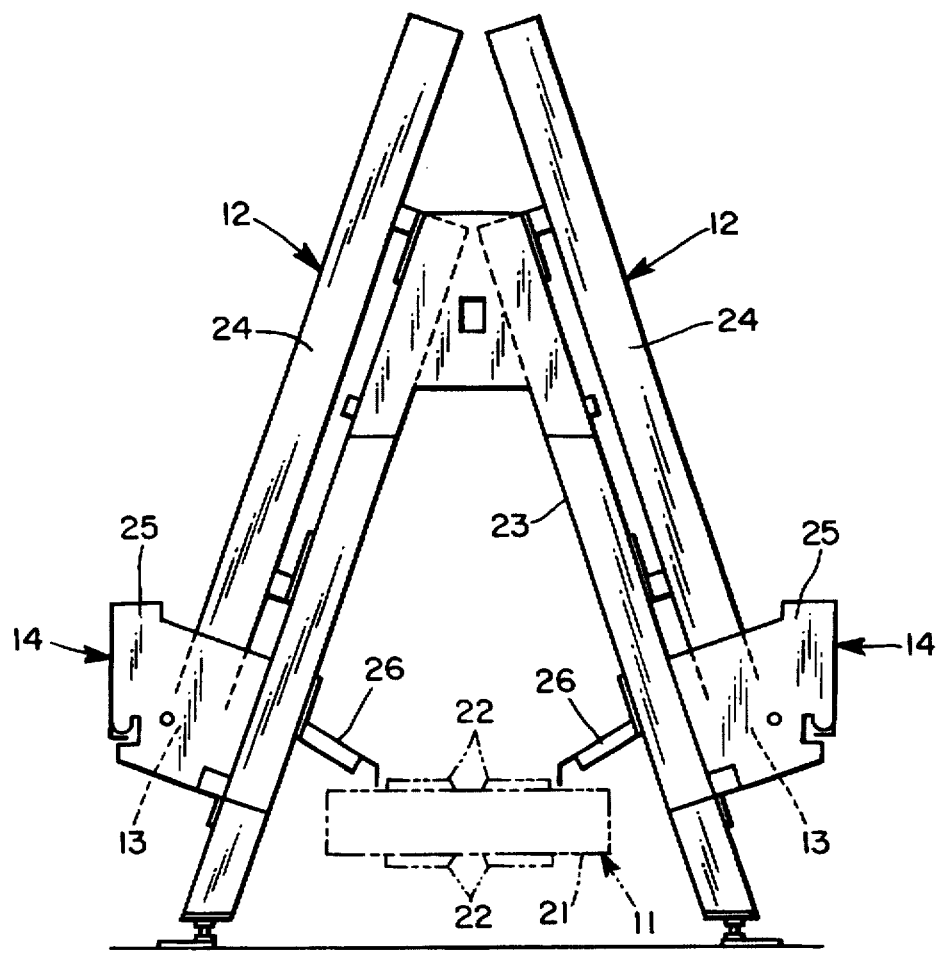
FIG. 3 is a front view of the object selecting system of FIG. 2.

Referring to FIG. 3, bridges 22 are formed on belt 21 at regular intervals in the longitudinal direction of belt 21. Bridges 22 confine objects A on conveyor 11 to an area bounded by two adjacent bridges 22.

Figure 4:
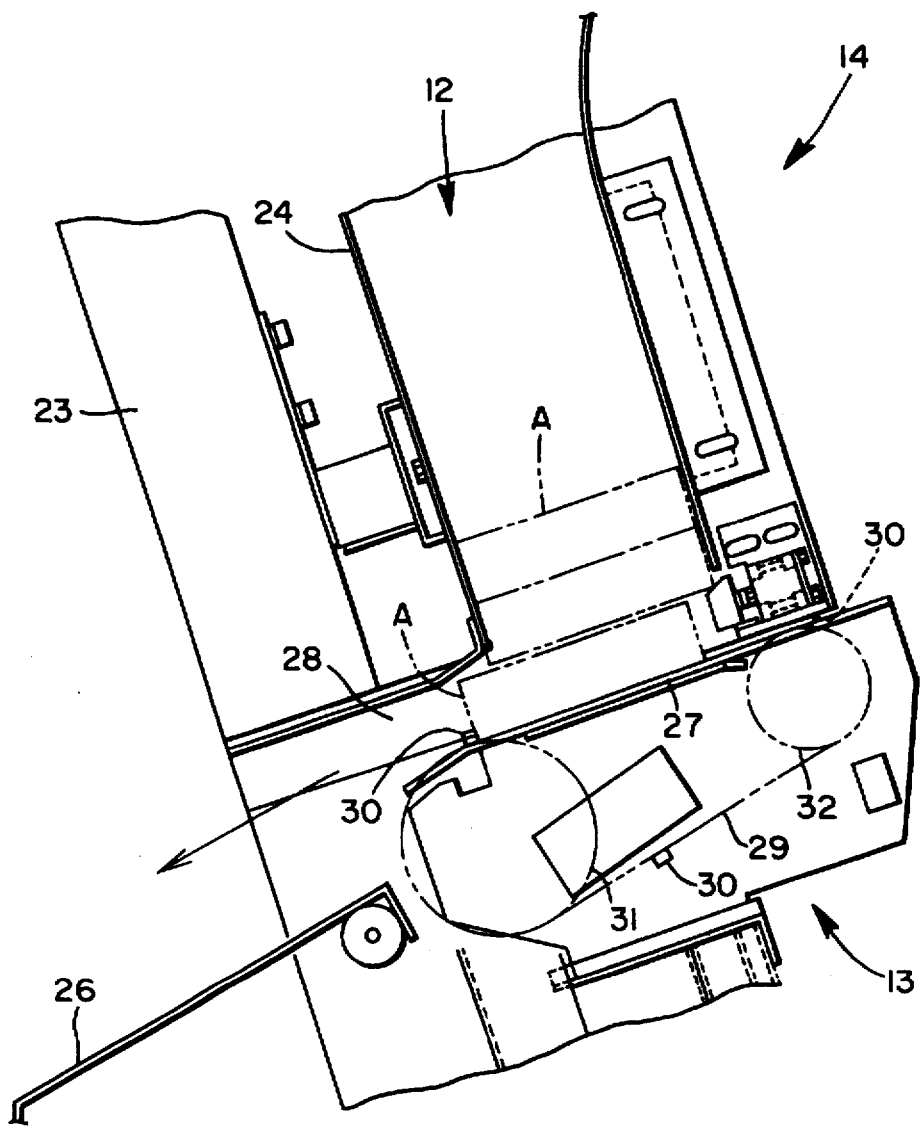
FIG. 4 is a sectional view of an object storage/discharge unit of the object selecting system of FIG. 2.

Referring to FIG. 4, each storage section 12 houses a plurality of objects A stacked one upon another in storage frame 24. A bottom plate 27 supports the bottommost object A at the bottom of each storage frame 24. A discharge port 28 is formed at a forward end ("forward" being with respect to the direction in which objects are discharged) of each storage section 12, between a bottom of storage frame 24 and bottom plates 27.

Each discharge mechanism 13 includes a discharge belt 29. Discharge belt 29 runs parallel to the direction in which objects A are discharged. Discharge belt 29 is wrapped around a pair of timing pulleys 31 and 32, which are rotatably mounted below bottom plates 27. Three discharge projections 30 are connected on the surface of discharge belt 29 at regular intervals. The three discharge projections 30 project above the upper surface of bottom plates 27, through a longitudinal gap between bottom plates 27 (the gap is not shown in Fig. 4). The bottommost object A in storage section 12 is pushed by one of the discharge projections 30 and discharged from object storage/discharge unit 14 onto chute 26 with each ⅓ turn of discharge belt 29.

Figure 5:
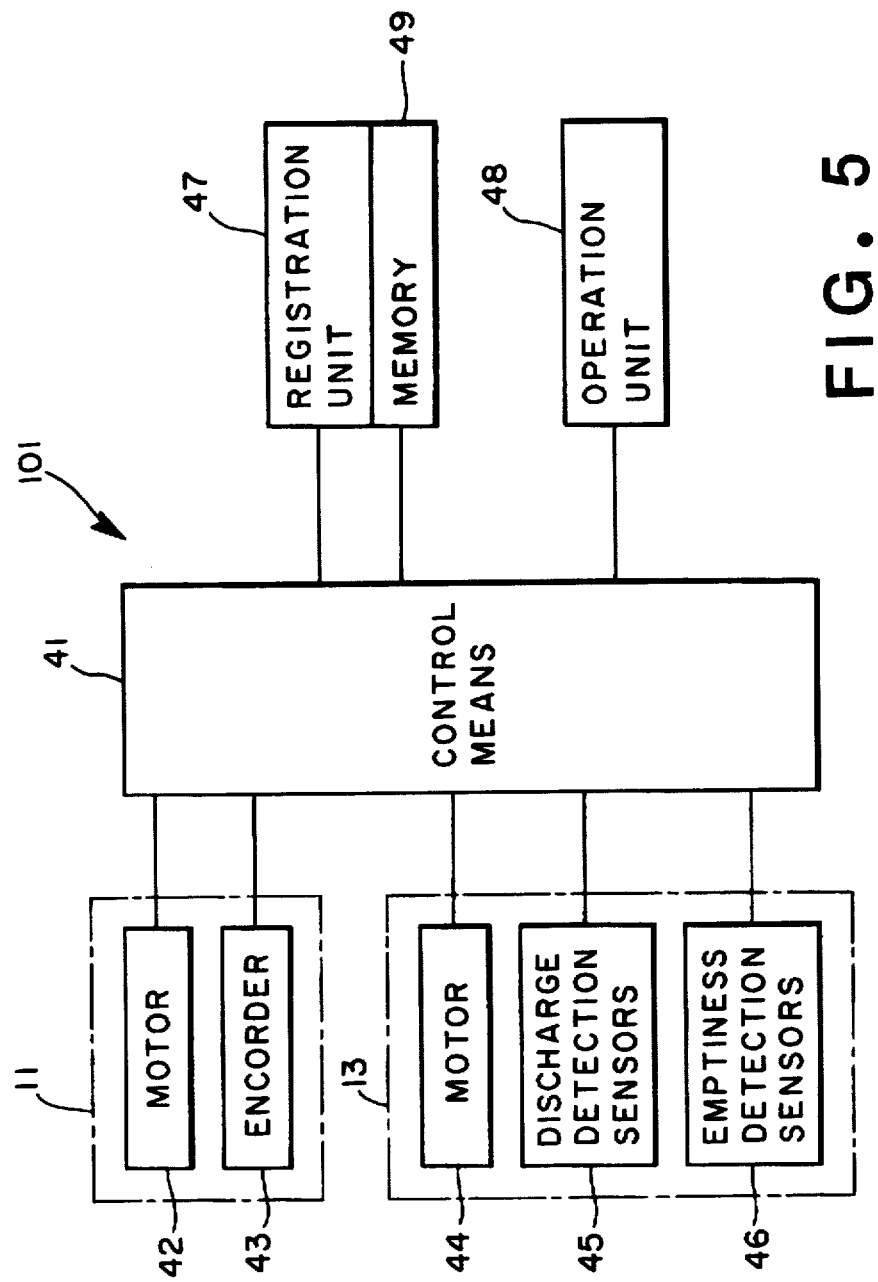
FIG. 5 is a block diagram of a control system of the object selecting system of FIG. 2.

Referring to FIG. 5, a control system 101 includes a controller 41 to which a belt motor 42 and an encoder 43 are connected. Referring also to FIG. 2, encoder 43 determines a distance traveled by the upper surface of belt 21 responsive to a rotation of a rotation axis of belt 21.

Referring now again to FIG. 5, controller 41 is also connected to a plurality of discharge motors 44. Referring also to FIG. 4, discharge motors rotate respective discharge belts 29 of discharge mechanisms 13. Discharge detection sensors 45 detect the complete discharge of objects A from respective discharge mechanisms 13. Emptiness sensors 46 detect when one of storage sections 12 is empty.

In an alternative embodiment, emptiness sensor 46 detects a low level of objects A in storage section 12. Controller 41 receives a signal from emptiness sensor 46 and warns an operator of the low level. Because the operator is warned before storage section 12 is empty, the operator can add appropriate objects A to storage section 12 before it is empty without stopping or even disturbing the continuous operation of object selecting system 100.

Referring now again to FIG. 5, a registration unit 47 registers the class of each object A and which object storage/discharge unit 14 object A is stored in. This information is input into a memory 49 which is accessed by controller 41.

Operation unit 48 enables an operator to input classes of objects into controller 41 and memory 49. Operation unit 48 includes a keyboard, a mouse, or any other input device which could be used by the operator to register the types of classes.

Operation unit 48 is also used by the operator to program the types of objects A and how many of each type of object A belong in each assortment of objects to be selected and loaded into a container.

Controller 41 includes the function of dividing the conveying path of belt 21 of conveyor into zones for each assortment of objects. The zones for each assortment are further divided into class zones according to the various classifications of objects in the assortment of objects. For example, controller 41 creates class zones in the order from a zone for heavier objects at the downstream side to light objects at the upstream side along the conveying path. Controller 41 also creates zones for unsteady objects and zones for steady objects, the zones for steady objects being provided upstream and downstream from the zone for the unsteady objects.

Referring now also to FIG. 2, when objects A are discharged from object storage/discharge units 14 onto belt 21 of conveyor 11, controller 41 is capable of causing each object storage/discharge unit 14 to discharge an object A into the zone corresponding to the class in which object A is registered by registration unit 47.

The function of the above described embodiment is as follows: When a command is specifically input to controller 41 to discharge a set of objects A of one selecting zone during operation of object selecting system 100, conveyor 11 is continuously rotated. Each object A is discharged by discharge mechanism 13 of object storage/discharge unit 14 when a discharge point at a specified location on belt 21 of conveyor 11 passes said object storage/discharge unit 14. Passage of the discharge point is detected by calculating the distance the upper surface of belt 21 travels based on a result of detection by encoder 43.

Object A, discharged by discharge mechanism 13, slides over chute 26 and come to rest on belt 21 in the proper zone. Object A is then conveyed by conveyor 11 and is discharged from the forward end of conveyor 11 with respect to conveying direction F. Object A discharged from conveyor 11 falls into container 15 which has been transported by container conveyor 16 to a position below the front end of the conveying path.

When all objects A of one selecting zone 102 have been placed in container 15, container conveyor 16 transports container 15, which now holds the assortment of objects A, away from the position below the end of the conveying path of conveyor 11 while another container 15 for receiving objects A of the next selecting zone 102 is transported to the position. The egress of container 15 containing objects A and introduction of new container 15 is completed before objects A of the next selecting zone are discharged from the front end of conveyor 11.

Figure 6:
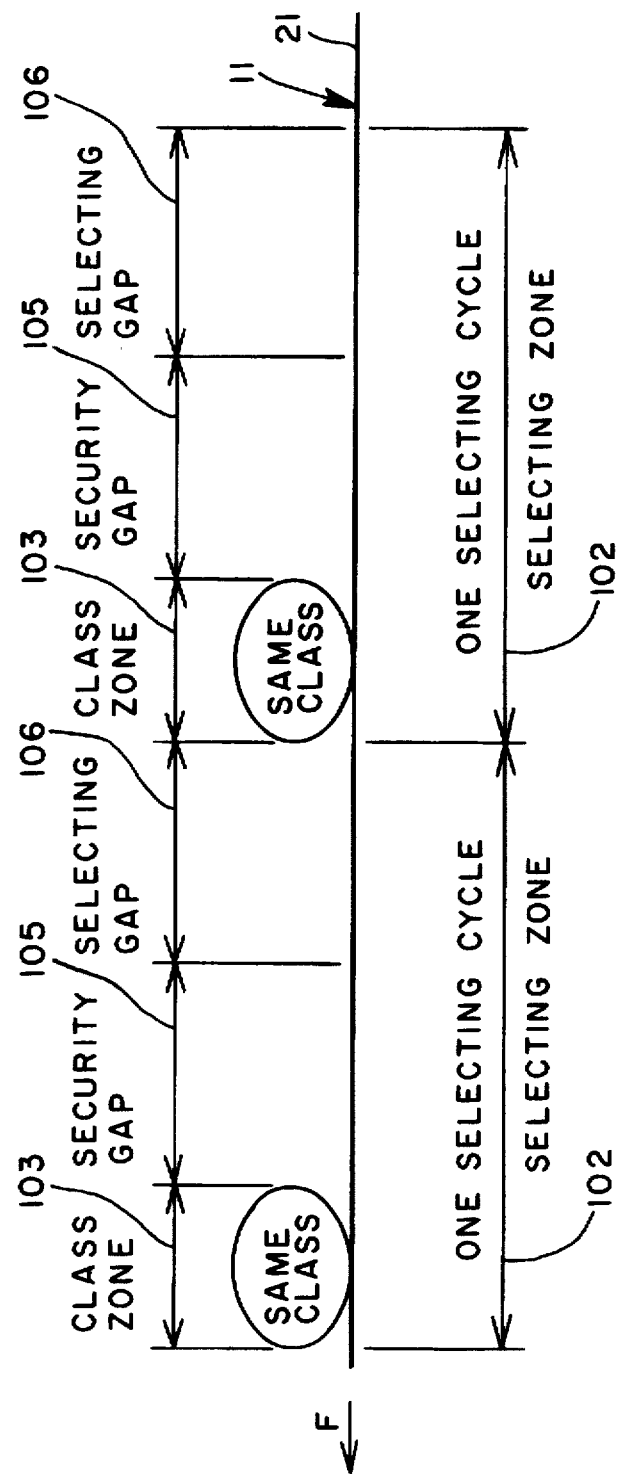
FIG. 6 is an explanatory drawing of the object selecting system of FIG. 2 showing an example of the procedure for selecting objects in the same class.

Referring to FIG. 6, an example of the zoning of belt 21 by controller 41, wherein all objects A to be retrieved have a similar shape and weight and therefore fall in the same class, includes creating one class zone 103, a security gap 105, and a selecting gap 106 arranged from the downstream side in the reverse order of conveying direction F are set on belt 21 of conveyor 11 as each unit of selecting zone 102.

Figure 7:
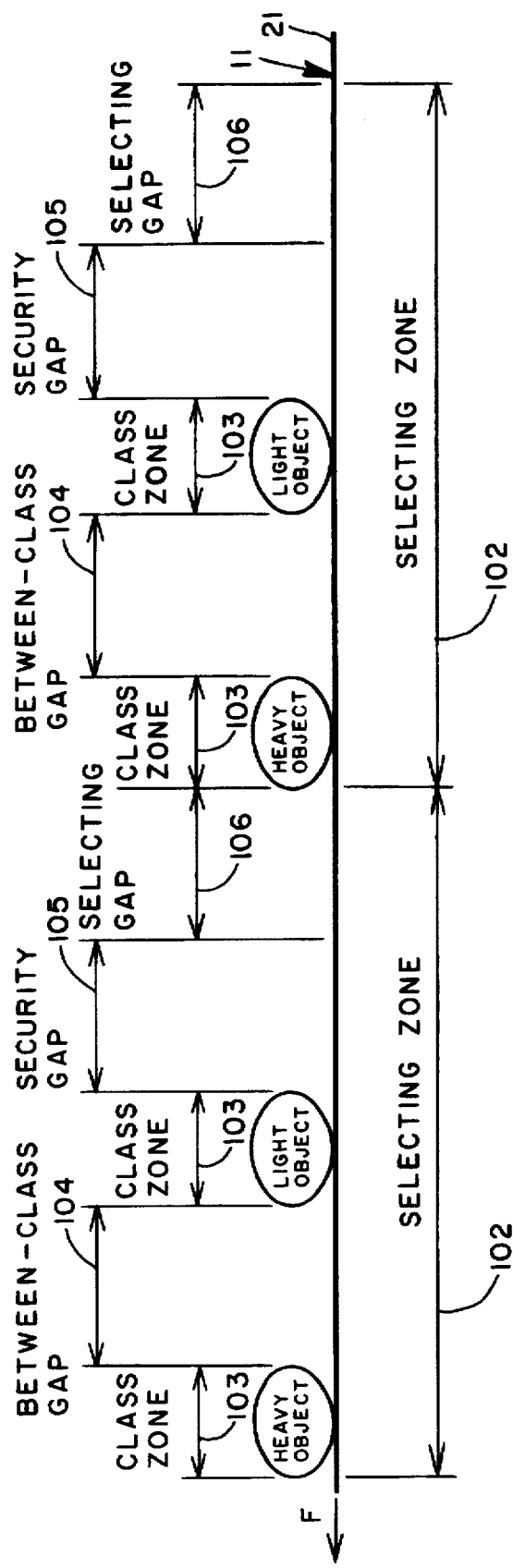
FIG. 7 is an explanatory drawing of the object selecting system of FIG. 2 showing objects sorted into two classes.

Referring to FIG. 7, an example of the zoning of belt 21 by controller 41, wherein objects A to be retrieved are divided into two classes: heavy objects and light objects, includes creating a heavy-object class zone 103, between-class gap 104, a light-object class zone 103, security gap 105, and selecting gap 106 arranged from the downstream side in the reverse order of conveying direction F are set on belt 21 of conveyor 11 as each unit of selecting zone 102.

Since the class zones are classified by weight, as described above, each object A is discharged into its corresponding class zone. Therefore, when any object A is discharged onto belt 21, impact between the discharged object A and other objects A already on belt 21, as well as the danger of dents or other damage which may otherwise occur to objects A, is reduced, because objects A of the same type are discharged into the same class zone. When objects A are discharged from the forward end of the conveying path of conveyor 11 into box 15, the impact against objects A which may cause dents or other damage to the lower positioned objects A is also reduced. Because heavier objects A precede lighter objects A on belt 21, the heavier objects A lie in the bottom of box 15 and are less susceptible to damage from lighter objects A that fall onto them than if the positions were reversed.

Figure 8:
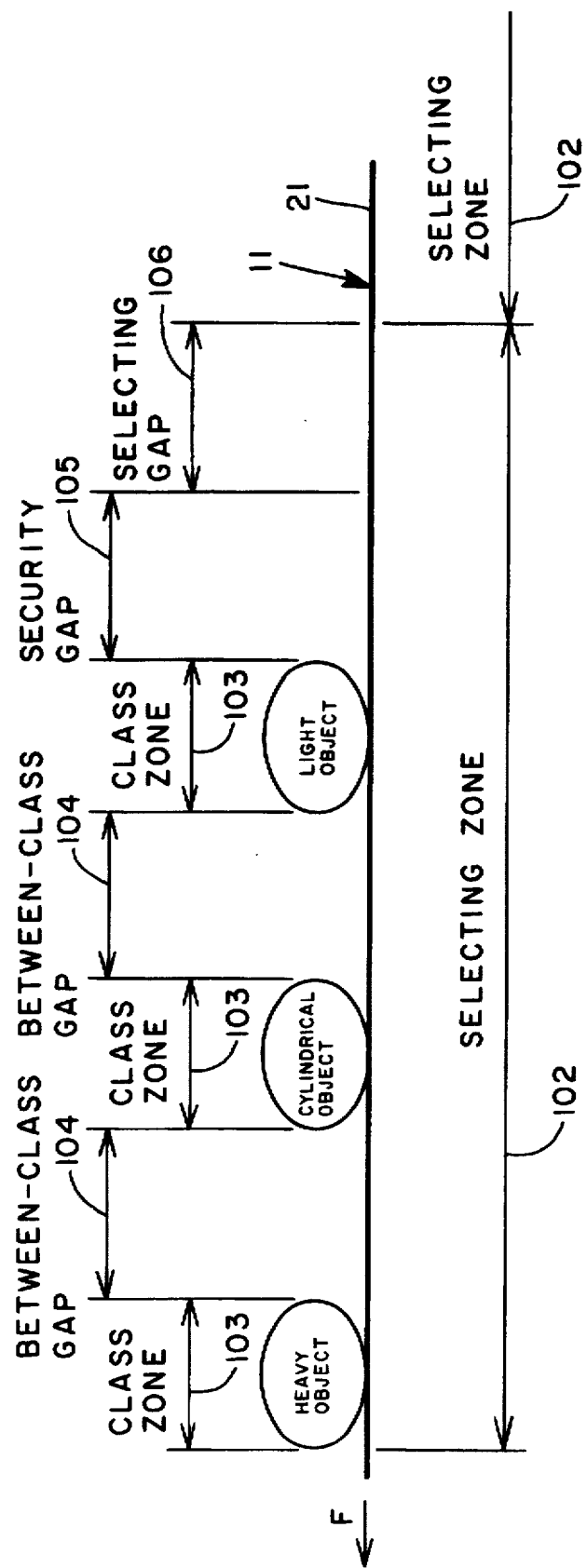
FIG. 8 is an explanatory drawing of the object selecting system of FIG. 2 showing objects sorted into three classes.

Referring to FIG. 8, another example of the zoning of belt 21 by controller 41, wherein objects A to be retrieved are divided into three classes: heavy objects, light objects and cylindrical objects which tend to tumble, includes creating a heavy-object class zone 103, between-class gap 104, a cylindrical-object class zone 103, between-class gap 104, a light-object class zone 103, security gap 105, and selecting gap 106 arranged from the downstream side in the reverse order of conveying projection F are set on belt 21 of conveyor 11 as each unit of selecting zone 102.

The arrangement of classes in this case reduces impact which may cause dents or other damage to objects A because objects of the same type are discharged into the same class zone 103. Furthermore, as class zone 103 for unsteady, cylindrical objects A is set between two different class zones 103 located upstream and downstream therefrom, when cylindrical objects tumble, the objects positioned upstream and downstream from the cylindrical objects prevent them from rolling completely out of selecting zone 102. This arrangement of class zones 103 ensures that cylindrical objects A are discharged into box 15 along with the correct selecting zone 102 and ensures that each box 15 will contain a complete set of objects A after loading is completed.

Figure 9:
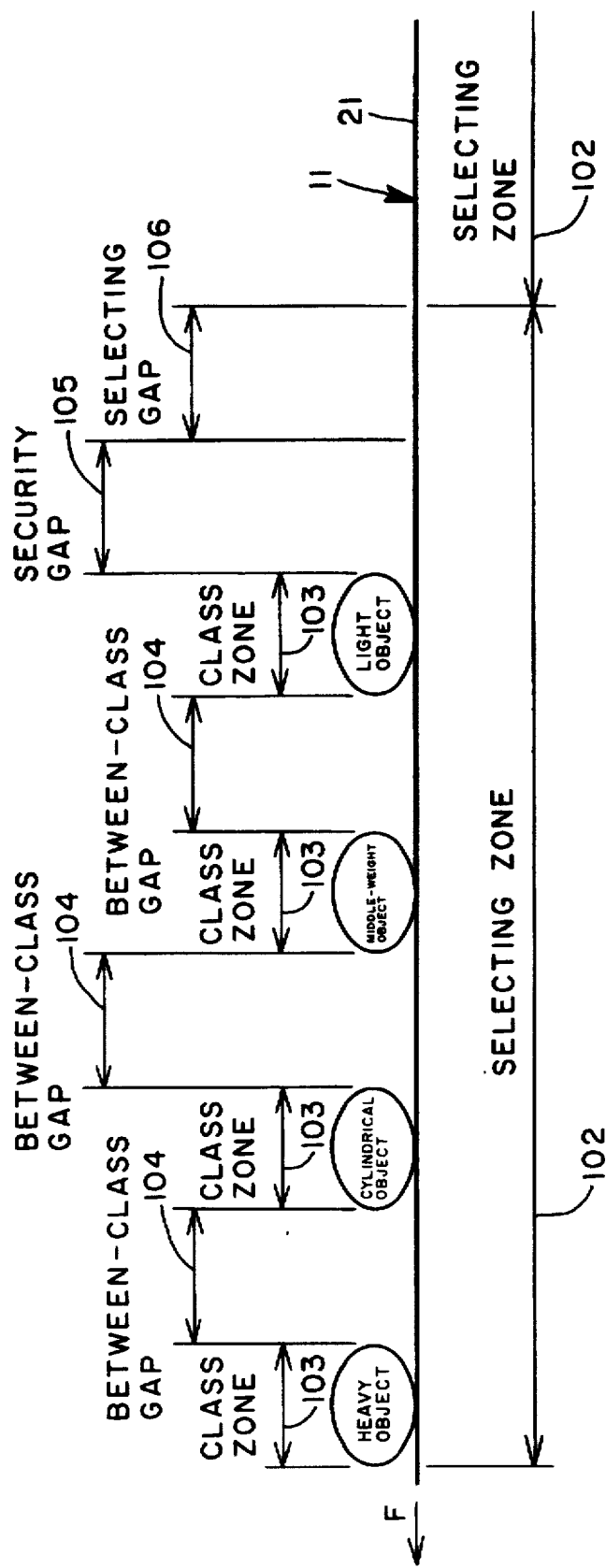
FIG. 9 is an explanatory drawing of the object selecting system of FIG. 2 showing objects sorted into four classes.

Referring to FIG. 9, another example of the zoning of belt 21 by controller 41, wherein objects A to be retrieved are divided into four classes: heavy objects, medium weight objects, light objects and cylindrical objects which tend to tumble includes creating a heavy-object class zone 103, between-class gap 104, a cylindrical-object class zone 103, between-class gap 104, a medium-object class zone 103, between-class gap 104, a light-object class zone 103, security gap 105, and selecting gap 106 arranged from the downstream side in the reverse order of conveying projection F are set on belt 21 of conveyor 11 as each unit of selecting zone 102.

In this example, the same effect as in the previous examples is obtained. Because objects A of the same type are discharged into the same class zone 103, impacts that may cause dents or other damage to objects A are reduced. Furthermore, the same effect as in the example of FIG. 8 ensures that cylindrical objects A are restricted within the limits of selecting zone 102 to which it belongs.

As described above, by classifying objects A according to their weight, shapes or other characteristics and setting class zones 103 which correspond to the respective types of objects A on belt 21 of conveyor 11 in conveying direction F, the danger of damage occurring to objects A is reduced. Furthermore unsteady objects are held within the limits of selecting zone 102 to which the objects belong so that a complete assortment of objects A is deposited in each box 15.

Having described the preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An apparatus for selecting and loading an assortment of objects into a container, comprising:

a conveyor for conveying objects to an end of said conveyor;

a plurality of object holders disposed along the length of the conveyor, each for holding a plurality of a single type of said objects;

said object holders each having an object dispenser;

a controller including means for registering the types of objects held in each of said plurality of object holders;

said controller defining the surface of the conveyor into a succession of selecting zones each for receiving a selectable set of objects from said object holders;

said selecting zones moving with said conveyor;

said controller further defining in each selecting zone a plurality of class zones each for receiving one type of said objects or no object from said object holders;

said class zones moving with their respective selecting zones;

said controller further controlling said object dispensers to dispense like objects in their respective class zones; and said conveyor delivering all objects in said selecting zone to an end of said conveyor.

2. The apparatus as claimed in claim 1 wherein said controller further defines the surface of said conveyor into:

a class gap between each adjacent pair of class zones; and at least one of a security gap and a selecting gap between each adjacent pair of selecting zones.

3. An apparatus according to claim 2, wherein said controller defines both a selecting gap and a security gap between each adjacent pair of selecting zones.

4. An apparatus according to claim 3, wherein said security gap precedes said selecting gap on said conveyor.

5. The apparatus of claim 1, wherein a definition of said class zones is responsive to a classification by at least one of weight or shape of said objects.

6. The apparatus of claim 1, wherein said controller further includes means for determining when any one of said object holders is empty.

7. The apparatus of claim 1, wherein said controller further includes means for determining when any one of said object holders is holding less than a predetermined amount of said objects.

8. The apparatus as claimed in claim 1 wherein:

said controller defines said class zones so that heavier objects are placed downstream from lighter ones;

objects that may roll are placed in between objects that do not roll; and objects that are neither heavy nor light are disposed between light and heavy objects.

9. An apparatus for selecting and loading at least one assortment, said assortment including at least one type of object, into a container, comprising:

an object conveyor for transporting said at least one assortment;

a plurality of object holders mounted along at least one side of said object conveyor;

a controller including means for defining discrete assortment zones on said object conveyor for each of said at least one assortment;

said controller further including means for dividing said assortment zone into discrete and separate class zones responsive to each different type of object in said at least one assortment; and each of said object holders including means for dispensing one of said at least one type of object onto said object conveyor in one of said discrete class zones.

10. The apparatus of claim 9, wherein said controller further includes means for registering said types of said objects held in each one of said object holders.

11. The apparatus of claim 10, wherein said means for registering includes:

a memory including information corresponding to type of said objects held in each of said object holders; and means for changing information in said memory responsive to an input device.

12. The apparatus of claim 11, wherein said means for dividing said assortment zone is responsive to said information in said memory.

13. The apparatus of claim 10, wherein said means for dividing is responsive to said means for registering.

14. An apparatus for selecting assortments of at least one type of object and loading each of said assortments into a container, comprising:

an object conveyor for transporting said objects;

a plurality of object holders mounted along at least one side of said object conveyor;

each of said object holders including means for dispensing a single one of said at least one type of object onto one of a plurality of discrete zones of said object conveyor;

said means for dispensing being responsive to both a type of said at least one type of object being dispensed and said position of said zones; and means for determining a position of said zones.

15. The apparatus of claim 14, further including:

a controller including means for defining discrete assortment zones on said object conveyor for each of said assortments;

said controller further including means for dividing each of said discrete assortment zones into said discrete zones responsive to a number of different types of objects are in said assortment.

16. The apparatus of claim 15, wherein said controller further includes means for registering said types of said at least one type of object held in each of said object holders.

17. The apparatus of claim 16, wherein said means for dividing is responsive to said means for registering.

18. The apparatus of claim 14, further including:

a controller; and said controller including means for registering said type of object held in each of said object holders.

19. The apparatus of claim 18, wherein said controller includes means for arranging an order of said plurality of discrete zones of said conveyor.

20. The apparatus of claim 19, wherein said order of said plurality of discrete zones is responsive to a classification by weight of said at least one type of object associated with said discrete zones.

21. The apparatus of claim 19, wherein said order of said plurality of discrete zones is responsive to a classification by weight and shape of said at least one type of object associated with said discrete zones.

22. The apparatus of claim 19, wherein said plurality of discrete zones of said conveyor includes discrete class zones for each type of said at least one type of object in said assortment, respectively, and class gaps between adjacent ones of said discrete class zones.

23. The apparatus of claim 22, wherein said order of said plurality of discrete zones is responsive to a classification by weight of said at least one type of object associated with said discrete zones.

24. The apparatus of claim 22, wherein said order of said plurality of discrete zones is responsive to a classification by weight and shape of said at least one type of object associated with said discrete zones.

25. The apparatus of claim 22, wherein said plurality of discrete zones of said conveyor also includes assortment gaps between adjacent assortments on said conveyor.

26. The apparatus of claim 22, wherein said controller includes means for determining when any one of said object holders is empty.

27. The apparatus of claim 22, wherein said controller includes means for determining when any one of said object holders is holding less than a predetermined amount of said objects.

28. The apparatus of claim 18, wherein said controller includes means for determining when any one of said object holders is empty.

29. The apparatus of claim 18, wherein said controller includes means for determining when any one of said object holders is holding less than a predetermined amount of said objects.

30. An apparatus for selecting and loading at least one assortment, said assortment including at least first and second types of objects, into a container, comprising:

an object conveyor for transporting said at least one assortment;

a plurality of object holders mounted along at least one side of said object conveyor;

a controller including means for defining discrete assortment zones on said object conveyor for each of said at least one assortment;

said controller further including means for dividing each of said discrete assortment zones into a plurality of discrete class zones responsive to each different type of said at least first and second types of objects in said at least one assortment; and each of said object holders including means for dispensing a single one of said at least first and second types of objects onto said object conveyor in one of said discrete type zones corresponding to said type of said at least first and second types of objects being dispensed.

* * * * *